April 14, 1964  T. GOLD  3,128,623
FLIGHT CONTROL SYSTEMS
Filed Sept. 7, 1960  3 Sheets-Sheet 1
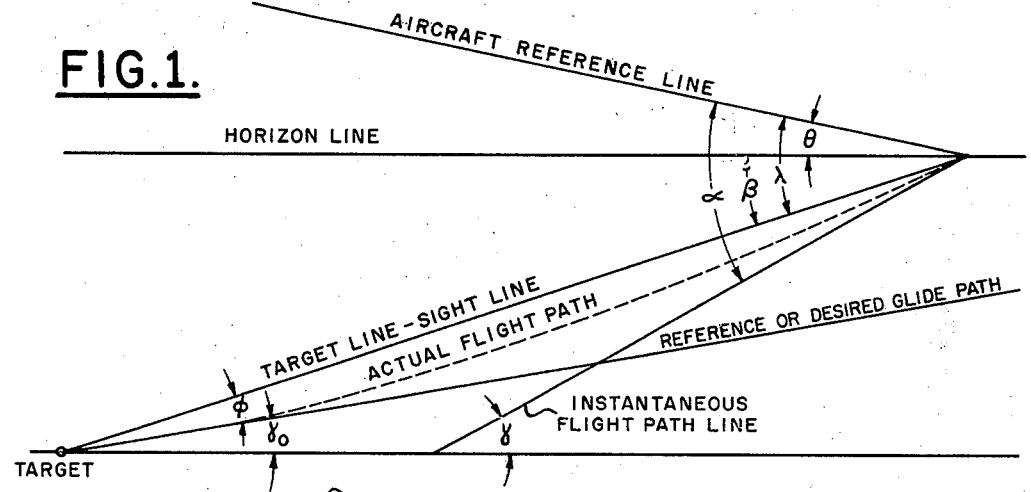
FIG.1.
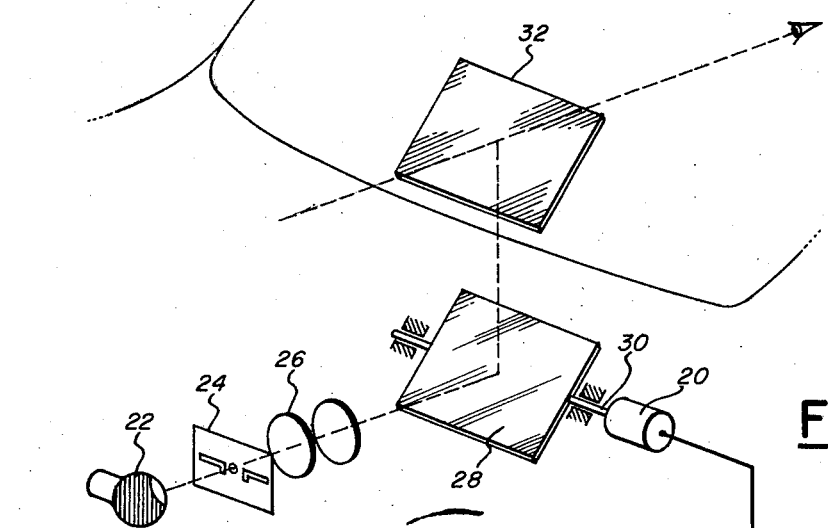
FIG.2.
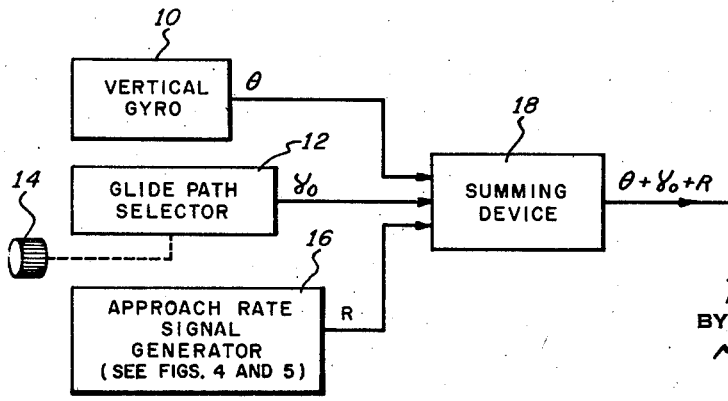
INVENTOR
*Theodore Gold*
BY
ATTORNEY April 14, 1964 T. GOLD 3,128,623
FLIGHT CONTROL SYSTEMS
Filed Sept. 7, 1960 3 Sheets-Sheet 2
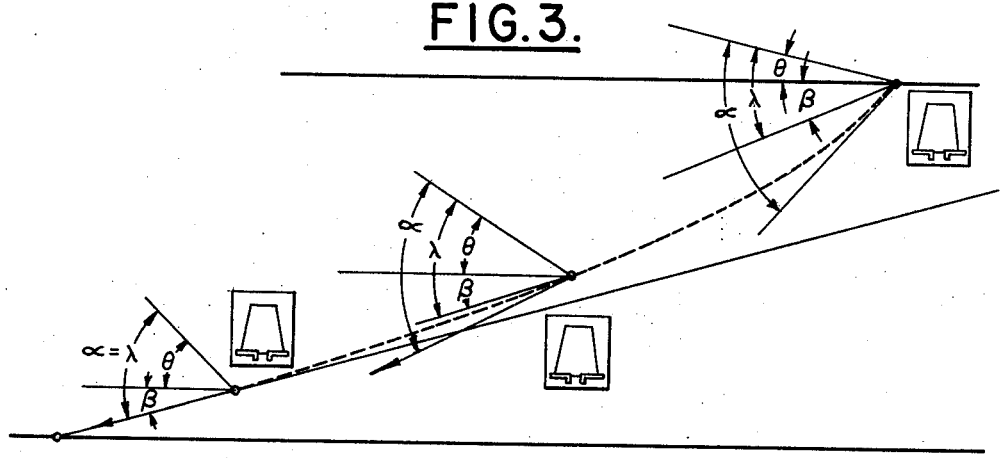
FIG.3.
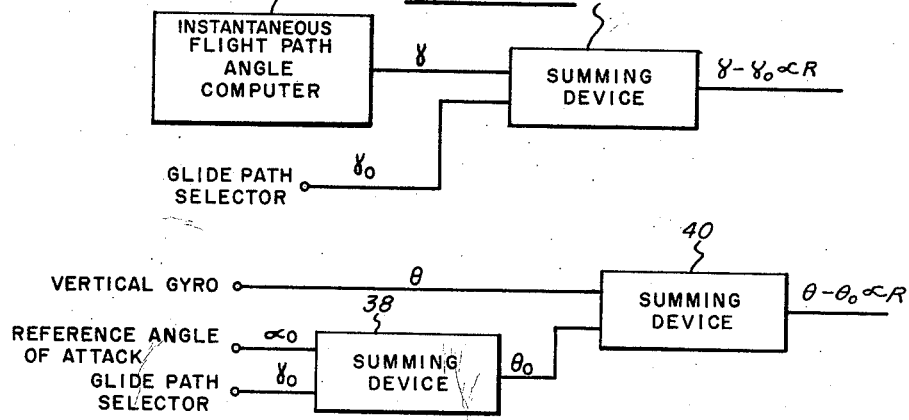
FIG.4.
FIG.5.
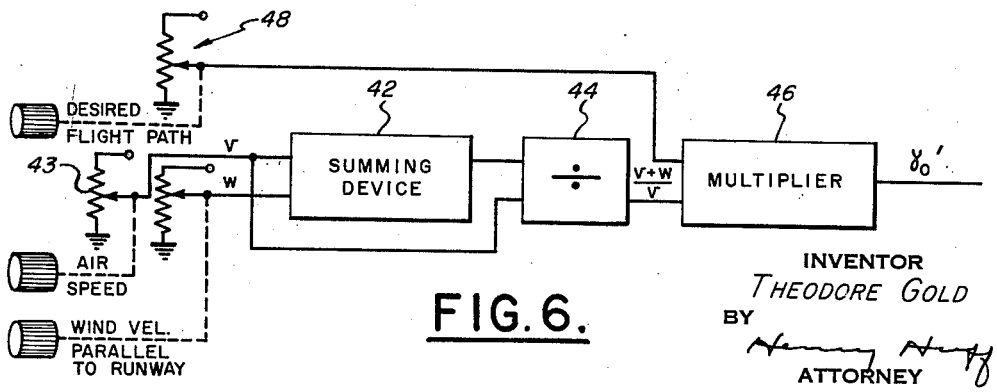
FIG.6.
INVENTOR
THEODORE GOLD
BY
ATTORNEY April 14, 1964     T. GOLD     3,128,623
FLIGHT CONTROL SYSTEMS
Filed Sept. 7, 1960     3 Sheets-Sheet 3

INVENTOR
THEODORE GOLD
BY
ATTORNEY

United States Patent Office 3,128,623
Patented Apr. 14, 1964

3,128,623
FLIGHT CONTROL SYSTEMS
Theodore Gold, Ronkonkoma, N.Y., assignor to Sperry Rand Corporation, Great Neck, N.Y., a corporation of Delaware
Filed Sept. 7, 1960, Ser. No. 54,400
11 Claims. (Cl. 73—178)

The invention relates generally to flight control systems and more particularly to apparatus for use in directing the flight of an aircraft along a desired flight path. In the following description, the desired flight path is illustrated as a path that leads to an airport runway or landing area but it should be understood that the concepts disclosed herein are not limited to a landing path but rather apply to any path along which it is desired to cause the craft to travel.

Usually, aircraft instrument landing approaches are made along a radio-defined glide path such as that provided by an Instrument Landing System. In such a system, a glide path receiver provides a signal proportional to the displacement of the craft from a radio-defined reference glide path and this displacement information may be presented to the pilot by means of a simple displacement indicator. By flying the craft so as to reduce the displacement indication to zero, the pilot will fly the craft along the reference glide path. Instrumentation has been devised whereby a pilot can fly a smooth or asymptotic approach to and thereafter be maintained on a radio-defined glide path. Such instrumentation is described in U.S. Patent 2,613,352, issued to S. Kellogg, 2nd, and assigned to the assignee of the present invention. As disclosed in this patent an asymptotic approach to the reference glide path is accomplished by equating a radio-derived signal proportional to the aircraft displacement from the reference glide path and a signal proportional to the craft rate of approach to the reference path. A panel mounted instrument indicating element responsive to this sum signal will read "zero" not only when the craft is on the beam but also when the craft is off the beam with its attitude so adjusted that the craft will eventually smoothly approach the beam. This type of indicator system may be termed a flight director. These systems, taken alone, do not provide the pilot with "cues," or elements of sensation as to the craft attitude, change in attitude and/or position relative to the runway or aircraft touchdown point. This is because they make a mere presentation of the craft displacement from a commanded glide path. The eyes of the pilot must constantly dart between the windscreen and the panel mounted indicator in order to coordinate what is seen on the instruments with that which is seen through the windscreen.

While the present invention is not intended to replace the aforementioned systems, it is, nevertheless, designed to complement those systems and provide the pilot with flight directing apparatus which may be utilized after breaking through overcast or at airports where no radio aids are available, or under conditions where an aircraft must make a forced landing. The invention presents flight path command data superimposed on the full view of the touchdown point and surrounding terrain, i.e. what the pilot actually sees through the windscreen. With this system the eyes of the pilot need not dart between an indicator on the panel and the craft windscreen to acquire visual cues for the landing maneuver. Generally, apparatus embodying the invention presents to the pilot an indication of a line of sight on a full view of the runway and the surrounding terrain. When the craft is flown so that the sight line is always directed at the desired touchdown point, a smooth or asymptotic approach to and flight down the reference or desired glide path will be effected. Thus the instrument of the present invention may be termed a flight director type of instrument.

A principal object of the invention is to provide sighting apparatus for an aircraft which, when the aircraft is flown so as to keep the line of sight steadily directed at a desired reference point, will direct the aircraft to fly a smooth approach to and remain on a reference or desired flight path.

Another object of the invention is to provide sighting apparatus for an aircraft which, when a landing craft is flown so as to keep the line of sight steadily aimed at a desired touchdown point, will direct the craft to fly a smooth approach to and remain on a reference or desired glide path.

Another object of the invention is to provide aircraft landing control apparatus which provides a maximum number of visual cues to the pilot.

Another object is to provide sighting apparatus which, when steadily aimed at a predetermined point, enables the pilot to fly his craft to a predetermined flight path at a path approach rate proportional to the path displacement.

Another object of the invention is to provide apparatus for changing the reference or desired flight path angle for a landing aircraft as a function of the wind component parallel to the runway on which the craft is to be landed.

The invention will be described with reference to the drawings, of which:

FIG. 1 is a diagram which is useful in explaining the principles of operation of the apparatus of the present invention;

FIG. 2 is a block diagram of one form of the invention;

FIG. 3 is a diagram showing the path that a craft would fly while coupling to a reference glide path with apparatus embodying the invention;

FIG. 4 is a block diagram of one form of apparatus for producing a signal proportional to the rate of approach of the craft to the desired flight path;

FIG. 5 is a block diagram of another form of apparatus for producing a signal proportional to the craft rate of approach to the desired flight path;

FIG. 6 is a block diagram of a presently preferred glide path selector;

Figure 7:
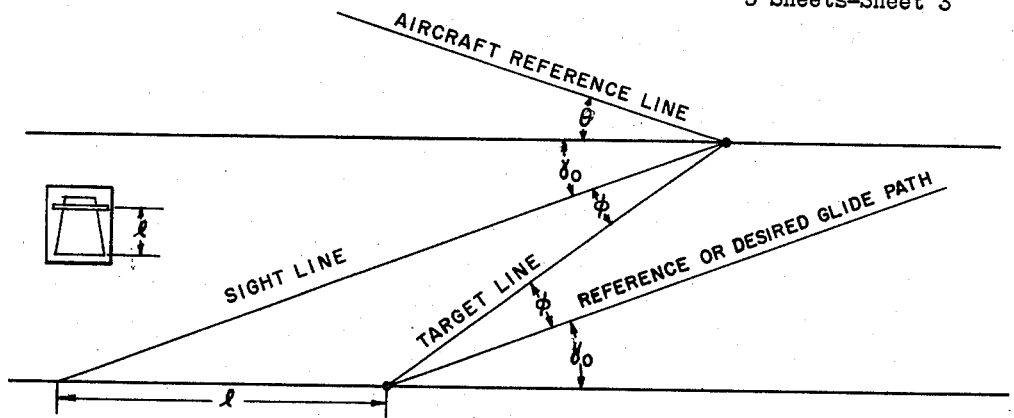
FIG. 7 is a diagram useful in explaining a modified form of the apparatus of the present invention.

Generally the invention has two basic requirements for coupling to a reference or desired glide path. The first requirement is that a line between the eye of a pilot and a desired touchdown point be coincidental with a generated sight line, the direction of which may be varied by changing the flight path of the aircraft. In FIG. 1, the aircraft reference line represents the longitudinal axis of the aircraft and the horizon line is a line parallel to the earth at the altitude of the craft. The pitch angle of the craft is the angle between these two lines and is represented by the angle $\theta$. The reference or desired flight path intersects the earth at the desired touchdown point, hereafter called the "target." However, it will be understood that the reference flight path may be any path along which it is desired to guide the plane and the "target" may be, for example, any fixed point in space, the craft being controlled to follow a predetermined flight path relative to that point. The reference or desired glide path or flight path makes the angle $\gamma_0$ with the earth, and the actual flight path makes the angle $\gamma$ with the earth. The algebraic sum of the actual flight path angle $\gamma$ and the pitch angle $\theta$ is the aircraft angle of attack $\alpha$. The angle $\beta$, called the "target angle," is the angle between the horizon line and the line between the eye of the pilot and the target, hereafter called the "target line." The angle $\phi$ between the reference or desired glide path and the target line is called the "deviation angle." This angle is proportional to the aircraft displacement from the reference or desired glide path. The generated sight line, when the craft is flown so that the first requirement is met, makes an angle $\lambda$, called the "lead angle," with the aircraft reference line.

The lead angle $\lambda$ equals the sum of the angles $\theta$ and $\beta$. The target angle $\beta$, likewise, is equal to the sum of the angles $\gamma_0$ and $\phi$. Therefore, the lead angle equals the sum of $\theta$, $\gamma_0$ and $\phi$, i.e. the pitch, reference glide path and deviation angles. So long as the craft is flown to keep the angle that the generated sight line makes with the aircraft reference line equal to the summation of $\theta$, $\gamma_0$ and $\phi$, that sight line will remain constantly on the target and can be used to direct an aircraft to the target (but not necessarily along the reference or desired glide path).

The second requirement of the invention is that the craft rate of approach to the reference or desired glide path be proportional (depending on the performance characteristics of the craft and the physical limitations of its pilot) to the craft displacement from that path. With this the case, a function of the rate of change of the displacement of the craft from the reference or desired glide path (multiplied by a suitable proportionality constant) may be substituted for the displacement angle $\phi$ in the computation of the sight line lead angle $\lambda$. In order to fulfill the second requirement, the lead angle $\lambda$ must be made equal to the sum of the aircraft pitch angle $\theta$, the reference guide path angle $\gamma_0$, and a function of the reference glide path displacement rate.

Referring to FIG. 2, a vertical gyro 10 produces a signal representing the pitch attitude $\theta$ of the aircraft with respect to the horizon. A signal representing the reference glide path angle $\gamma_0$, is provided by a glide path selector 12 which, in its simplest form, may be a manually adjustable potentiometer. A knob 14 is mechanically connected to the selector 12 to permit the pilot to preselect the glide path along which he wants to fly. An approach rate signal generator 16, to be described in more detail below in reference to FIGS. 4 and 5, produces a signal representing the difference between the instantaneous direction of the actual flight path and the direction of desired glide path, i.e. a signal approximately representing the rate of approach R to the reference glide path. All three signals are applied to and added by a summing device 18, the output signal of which is applied to a servo system 20 which applies a mechanical displacement corresponding to the magnitude and sense of its input signal.

A reflex type sight having a light source 22, a reticle producing mask 24, and a collimating lens 26, has the light from the source 22 directed at a mirror 28. The mirror 28 is rotatable about an axis 30 and directs the light onto a combining glass 32 which may be the aircraft windscreen or a separate glass supported adjacent the windscreen. This combining glass 32 is tilted so that the incident light is reflected in the direction of the eyes of the pilot. As is known, the combining glass 32 is a sheet of transparent, but reflective, material through which the pilot looks. Because the light is collimated when it reaches the eyes of the pilot, he sees, focused at infinity, the image of a reticle mask 24 hereinafter referred to as the "reticle." The direction of collimated light rays thus constitutes a particular line of sight, i.e. the sight line of FIG. 1. The output of servo system 20 is mechanically connected through suitable gearing to the mirror 28 and rotates the mirror 28 about the axis 30 to a position corresponding to the output signal from the summing device 18. As the mirror rotates, the point at which the light strikes the glass 32 is varied vertically along the glass and, hence, varies the direction of the sight line. Whereas a preferred form of the invention uses a reflex type sight, other types of sighting devices may also be used such as telescopes, peep sights and the like. However, the reflex type sight is preferred because it does not obstruct the normal vision of the pilot. Also, a reflex type sight presents a reticle focused at infinity which will therefore appear to be superimposed on the field of view of the pilot, i.e. on the "target" viewed by the pilot.

When the aircraft is flown so that the reticle is steadily maintained on the target, i.e. the approach end of the runway, an asymptotic approach path similar to that shown in FIG. 3 will be effected. As shown in FIG. 3, with the angle of attack held constant (exaggerated for illustrative purposes), the actual flight path angle $\gamma$ may be caused to approach the reference glide path angle $\gamma_0$ by changing the pitch attitude $\theta$ of the craft. For large displacements from the reference glide path, the aircraft rate of approach necessary to hold the sight line on the target is great: for small displacements, the rate of approach necessary is small.

FIGS. 4 and 5 show two forms of approach rate signal generators (16, FIG. 2) suitable for use in the apparatus shown in FIG. 1. In FIG. 4, an instantaneous flight path angle computer 34 which may be of the type disclosed in U.S. Patent 2,896,145 issued to R. Snodgrass and assigned to the assignee of the present invention provides a signal representing the instantaneous flight path angle $\gamma$ of the craft. This signal is applied subtractively to a summing device 36 along with a signal representing the angle $\gamma_0$ that the reference or desired glide path makes with the earth. This signal is obtained from the glide path selector 12 of FIG. 2. The summing device 36 is connected to receive both of these signals and produces an output signal representing the difference therebetween. This difference signal represents the angle between the reference and instantaneous flight path lines. From an inspection of FIG. 1 it will be seen that this difference signal is a direct measure of the craft rate of approach to the reference glide path. FIG. 5 illustrates another means for producing a signal representing the craft rate of approach to the reference or desired glide path. In this figure a signal representing the actual pitch attitude $\theta$ of the craft and a signal representing a reference pitch attitude $\theta_0$ (which is the pitch attitude necessary to fly along the reference or desired glide path) are combined. The actual craft pitch attitude signal is obtained from the vertical gyro 10 as before. The reference pitch attitude signal is obtained by algebraically summing a signal proportional to the reference flight path angle $\gamma_0$ with a signal proportional to a craft reference angle of attack $\alpha_0$ (which may be provided by a potentiometer adapted to be set by the pilot) in a summing device 38, this algebraic summation being in accordance with the relationship $\theta_0=\alpha_0-\gamma_0$, which relationship has the same algebraic form as the above-mentioned relationship $\alpha=\gamma+\theta$. The signal representing the actual aircraft pitch is then applied to a summing device 40 along with the reference pitch signal $\theta_0$, the output of which is a signal representing the difference between its two input signals, i.e. the actual craft pitch relative to the reference pitch.

As was earlier stated, the glide path selector 12 can be a simple potentiometer which supplies a voltage proportional to the desired flight path angle $\gamma_0$. However, with large head or tail winds having components parallel to the runway on which the craft is landing, steeper or shallower landing approaches respectively will occur unless some compensation be made for wind. This is because the actual path angle of the craft with respect to the earth is increased by a head wind, and decreased by a tail wind, all other factors remaining unchanged. FIG. 6 discloses means for compensating for winds having components parallel to the runway. As shown in this figure, the reference flight path angle signal is varied as a function of the component of wind velocity along the runway. As shown, a signal $v$ representing the air speed of the craft and a signal $w$ representing the wind component parallel to the runway are applied to a summing device 42. Usually, the wind component signal is set in manually by the pilot in accordance with radio instructions received from the airport tower; the air speed signal is set by the pilot by adjusting potentiometer 43. The output signal from the summing device 42, which represents the algebraic sum of its input signals, is applied to a divider 44 together with a signal $v$ representing the air speed of the craft. The divider 44 provides a correction signal representing the quotient of its input signals which correction signal is applied to a multiplier 46. A signal representing a desired flight path angle $\gamma_0$ (in the absence of winds parallel to the runway) is provided by an adjustable potentiometer 48. This signal is applied to the multiplier 46 wherein it is multiplied by the correction signal. The output signal from the multiplier 46 represents a new reference flight path angle $\gamma'_0$, which has been corrected for wind. The circuit of FIG. 6 operates as follows: In the absence of winds parallel to the runway, the output signal from divider 44 represents "1" and $\gamma_0$ equals $\gamma'_0$. In the presence of head winds, the signal $\gamma'_0$ is made smaller than $\gamma_0$ by multiplying $\gamma_0$ by a correction signal which represents a quantity less than "one." The new reference flight path angle $\gamma'_0$ is therefore less than it would be in the absence of a wind. However, because of the effect of the wind, the craft always flies at the same angle with respect to the earth. A tail wind produces the situation wherein the reference flight path angle signal $\gamma'_0$ is greater than the signal $\gamma_0$ and is similarly corrected.

Figure 8:
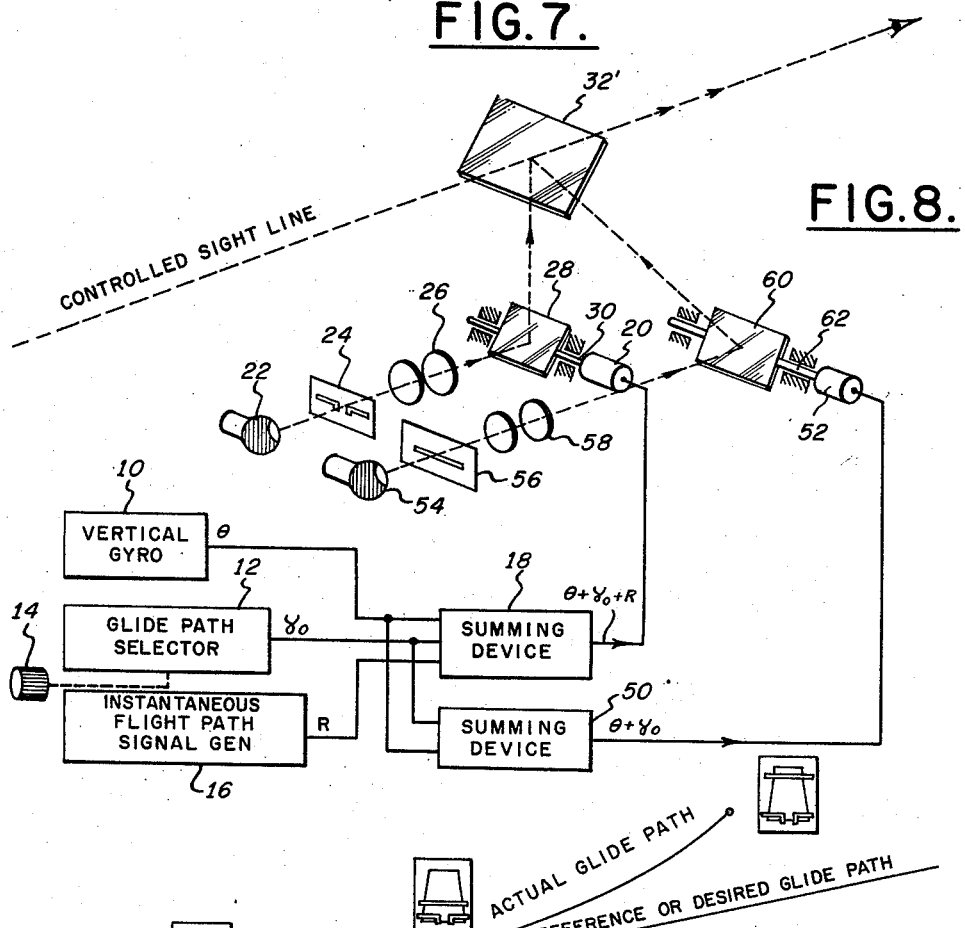
FIG. 8 is a schematic presentation in block form of apparatus incorporationg a path deviation-type sight with a flight director-type sight.
Figure 9:
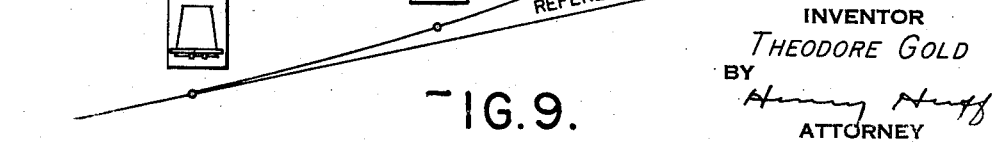
FIG. 9 is a diagram, similar to that of FIG. 3, showing the effect on the sight presentation when director and deviation sight techniques are employed together.

The apparatus shown in FIG. 2 may be simply modified to provide the pilot with, in addition to flight director information, information as to his actual displacement from the reference glide path. Referring to FIG. 7, the deviation angle $\phi$ is a measure of the displacement of the craft from the reference or desired glide path. If a sight line is provided, as earlier described, at an angle (with respect to the craft reference line) equal to the sum of the pitch angle $\theta$ and reference flight path angle $\gamma_0$, the reticle will be displaced from the target by an amount $e$. The displacement $e$ is proportional to the deviation angle $\phi$ which, in turn, is a measure of the displacement of the craft from the reference or desired glide path. The modified apparatus of FIG. 2 is shown in FIG. 8. The summing device 50 receives the signals representing $\gamma_0$ and $\theta$ respectively from the guide path selector 12 and the vertical gyro 10, and provides an output signal representing the algebraic sum of those signals. This sum is applied to a positioning servo system 52 which may be similar to the servo 20 of FIG. 2 and operates sighting apparatus in a similar manner. In FIG. 8, a second reticle system is provided and includes a lamp 54, a reticle producing mask 56, a collimating lens 58 and a rotatable mirror 60. The mirror 60 is mechanically connected through suitable gearing to the servo 52 which operates to rotate the mirror about the axis 62. The mirror 60 is so oriented that the light from the lens 58 which impinges on it is directed at the combining glass 32 and thence to the eyes of the pilot, somewhat in the manner shown in U.S. Patent 2,887,927. Thus, two reticle images and hence two controlled sight lines are produced, one defining a sight line which, if maintained on the target by correction in craft attitude, will cause the craft to asymptotically approach and maintain the desired or reference flight path, i.e. the "director" operation, and the other defining a sight line which continually informs the pilot as to his actual displacement from the reference flight path; i.e. the "displacement" operation. The sight lines defined by these two reticle images serve as monitors for each other. Thus, with the craft flying a path as shown in FIG. 3, i.e. with the director sight steadily held on the target, the display presented to the pilot by the apparatus of FIG. 8 will be as illustrated in FIG. 9. That is, the separation between the sight lines produced by the director reticle and the displacement reticle will gradually reduce to zero as the craft asymptotically approaches the reference or desired glide path.

The apparatus of FIGS. 2 and 8 may be further modified by making the mirror 28 rotatable about an axis parallel to the yaw axis of the craft. With this modification, sight line azimuthal direction errors caused by cross winds may be compensated for. That is, when the reticle is laterally displaced from the target due to a cross wind, the pilot can manually rotate the mirror 28 about this axis to position the reticle in line with the target. Also, a smooth flare-out maneuver may be performed with the apparatus of FIGS. 2 and 8 if, at a predetermined altitude or distance from touchdown, the craft is flown so that the director reticle is superimposed successively on one or more new targets along the runway. In addition to presenting a sight line which, if steadily directed at a target, will guide the craft smoothly to and along a reference glide path, the reticle presentation, as illustrated, inherently provides roll attitude information. That is, the reticle rotates with the craft in the field view as the craft rolls. Thus, craft roll attitude relative to the runway and other terrain is presented to the pilot. However, if desired one or both of the reticle masks 24 and 56 may be stabilized in roll to thereby roll stabilize the reticle images relative to the target or the reticle images will then be maintained in a fixed roll orientation relative to the target.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for enabling a craft to be directed to and maintained on a reference flight path projecting from a reference point comprising means producing a signal representing the attitude of said aircraft relative to said reference flight path, means producing a signal representing the rate of approach of said aircraft to said reference flight path, means connected to receive said attitude and approach rate signals and produce a signal representing the algebraic sum of those signals, means secured to said aircraft defining a line of sight and means responsive to said sum signal for controlling said means defining a line of sight for varying the direction of the sight line relative to the longitudinal axis of said aircraft in proportion to said sum signal, whereby said aircraft will asymptotically approach and maintain said reference flight path when said aircraft is controlled so as to maintain the line of sight directed at said point.

2. Apparatus for directing the flight of an aircraft to a reference glide path comprising means producing a signal representing the attitude of said aircraft relative to said reference glide path, means producing a signal representing the rate of approach of said aircraft to said reference glide path, means receiving said attitude and approach rate signals and producing a signal representing the sum of those signals, means secured to said aircraft defining a line of sight and means receiving said sum signal operable with said means defining a line of sight to vary the direction of the sight line relative to the craft longitudinal axis about an axis parallel to the aircraft pitch axis in proportion to said sum signal, whereby said aircraft will make a smooth approach to and eventually fly along said reference glide path if said aircraft is flown so that the line of sight is always directed at the point where the reference glide path meets the ground.

3. Apparatus for use in directing an aircraft to and along a reference glide path comprising sight means secured to said craft, means producing a signal representing the angle between the longitudinal axis of said aircraft and said reference glide path, means producing a signal representing the rate of approach of said aircraft to said reference glide path, means receiving both said signals and producing a signal representing their sum, and means receiving said sum signal operable with said sight means to rotate said sight means line of sight relative to said longitudinal axis about an axis parallel to the aircraft pitch axis in proportion to said sum signal, whereby said aircraft smoothly couples to said reference glide path when said line of sight is maintained in the direction of the desired touchdown point.

4. Apparatus for use in guiding an aircraft to a landing along a reference glide path comprising means producing a signal representing the pitch of said aircraft, means producing a signal representing the angle that the reference glide path makes with the earth, means producing a signal representing the rate of approach of said aircraft to said reference glide path, means receiving all of said signals and producing a signal representing their algebraic sum, reticle means secured to said aircraft, and means operable with said reticle means receiving said sum signal and rotating relative to the longitudinal axis of the craft the line of sight through said reticle about an axis parallel to the aircraft pitch axis in proportion to said sum signal, whereby the aircraft will make a smooth approach to said reference glide path if said reticle line of sight is maintained directed at the desired touchdown point.

5. Glide path guidance apparatus comprising means producing a signal representing the flight path angle of an aircraft, means producing a signal representing the flight path angle of a desired glide path, means receiving both said signals and producing a signal representing their difference, means producing a signal representing the pitch of said aircraft, means receiving said pitch, difference, and desired flight path angle signals and producing a signal representing their algebraic sum, sight means secured to said aircraft, and means coupled to receive said sum signal and vary relative to the craft longitudinal axis said sight means line of sight about an axis parallel to the craft pitch axis in proportion to said sum signal, whereby the aircraft will fly a smooth approach to and remain on the desired glide path if the sight line is maintained directed at the intersection of the desired glide path and the ground.

6. Apparatus for use in guiding an aircraft to a landing along a reference glide path comprising means producing a signal representing the pitch of said aircraft, means producing a signal representing the aircraft pitch necessary at the particular aircraft air speed to fly along a path parallel to the reference glide path, means receiving both said signals and producing a signal representing their difference, means producing a signal representing the flight path angle of the reference glide path, means receiving said difference, aircraft pitch, and reference flight path angle signals and producing a signal representing their sum, sight means secured to said craft, and means receiving said sum signal coupled to said sight means to vary in pitch relative to the craft longitudinal axis the lead angle of said sight means in proportion to said sum signal, whereby the continued directing of the sight means line of sight at the intersection of the reference glide path and the earth will result in the craft flying a smooth approach to the reference glide path.

7. Apparatus for use in directing the flight of an aircraft to a reference glide path comprising means producing a signal representing the attitude of said aircraft relative to said reference glide path, means producing a signal representing the rate of approach of said aircraft to said reference glide path, means receiving said attitude and approach rate signals and producing a signal representing the sum of those signals, transparent reflective viewing means secured to said craft and tilted about an axis parallel to the craft pitch axis, means producing an optical image of a reticle, means collimating and directing the light rays which comprise said reticle image at said viewing means, whereby said rays are reflected to the eye of the pilot, said collimation of the rays operating to make the image appear at optical infinity, and means receiving said sum signal operable with said means directing the light rays to vary vertically the point on the viewing means where the light rays are directed, whereby said aircraft will smoothly couple to the reference glide path if the aircraft is flown so as to keep the reticle image on the desired touchdown point.

8. Apparatus for use in directing an aircraft to and along a reference glide path comprising means producing a signal representing the angle between a line along the longitudinal axis of said aircraft and said reference glide path, means producing a signal representing the rate of approach of said aircraft to said reference glide path, means receiving both said signals and producing a signal representing their sum, transparent reflective viewing means secured to said craft and tilted about an axis parallel to the craft pitch axis, and means receiving said sum signal producing and directing, at said viewing means, a virtual image of a reticle positioned at optical infinity, said direction of the reticle image at said viewing means being variable about an axis parallel to the aircraft pitch axis in proportion to said sum signal, whereby smooth coupling to the reference glide path is effected when the reticle image is maintained superimposed on the desired touchdown point.

9. Apparatus for use in guiding an aircraft to a landing along a reference glide path comprising means producing a signal representing the pitch of said aircraft, means producing a signal representing the angle that the reference glide path makes with the earth, means producing a signal representing the rate of approach of said aircraft to said reference glide path, means receiving all of said signals and producing a signal representing their algebraic sum, transparent reflective viewing means secured to the craft and tilted about an axis parallel to the craft pitch axis, means producing an optical image of a reticle, means collimating and directing the light rays which comprise said reticle image at said viewing means, whereby said rays are reflected to the eye of the pilot, said collimation of the rays operating to make the image appear at optical infinity, and means receiving said sum signal operable with said means directing the light rays to vary vertically the point on the viewing means where the light rays are directed, whereby said aircraft will smoothly couple to the reference glide path if the aircraft is flown so as to keep the reticle image on the desired touchdown point.

10. Apparatus for use in smoothly directing an aircraft to a reference glide path while, at the same time, indicating the aircraft displacement from that path comprising means producing a signal representing the pitch of said aircraft, means producing a signal representing the angle that the reference glide path makes with the earth, means producing a signal representing the rate of approach of said aircraft to said reference glide path, means receiving all of said signals and producing a signal representing their algebraic sum, first reticle means secured to the craft, means receiving said sum signal operable with said first reticle means to vary relative to the craft longitudinal axis the line of sight through the reticle about an axis parallel to the aircraft pitch axis in proportion to said sum signal, means receiving said pitch and said reference glide path angle signals and producing a signal representing their sum, second reticle means secured to the craft, and means operable with said second reticle means receiving said last mentioned sum signal and rotating relative to the craft longitudinal axis the line of sight through the second reticle about an axis parallel to the pitch axis, whereby the aircraft will smoothly approach the reference glide path when said first reticle line of sight is maintained aimed at the touchdown point and whereby the misalignment of the line of sight of the second reticle and the touchdown point is a measure of the displacement of the aircraft from the reference glide path.

11. Apparatus for use in smoothly directing an aircraft to a reference glide path while, at the same time, indicating the aircraft displacement from that path comprising means producing a signal representing the pitch of said aircraft, means producing a signal representing the angle that the reference glide path makes with the earth, means producing a signal representing the rate of approach of said aircraft to said reference glide path, means receiving all of said signals and producing a signal representing their algebraic sum, transparent reflective viewing means secured to said aircraft, means suitably tilted about an axis parallel to the craft pitch axis producing an optical image of a first reticle, means colliminating and directing the light rays which comprise said first reticle image at said viewing means, whereby said rays are reflected to the eye of a pilot, said collimation operating to make the image appear at optical infinity, means receiving said sum signal operable with said means directing the light rays to vary vertically the point on the viewing means where the light rays are directed, means producing an optical image of a second reticle, means collimating and directing the light rays which comprise said second reticle image at said viewing means, whereby said rays are reflected to the eye of the pilot said collimation of the second reticle image rays operating to make that image appear at optical infinity, means receiving said pitch and reference glide path signals and producing a signal representing their sum, means receiving said last mentioned sum signal operable with said means directing the rays of said second reticle image to vary vertically the point on the viewing means where those rays are directed, whereby the craft will smoothly couple to the reference glide path when the first reticle line of sight is maintained directed at the desired touchdown point and the displacement of the craft from the reference glide path is measured by the misalignment between the second reticle line of sight and the touchdown point.

References Cited in the file of this patent

UNITED STATES PATENTS

| | | |
|---|---|---|
| 2,357,777 | Douden | July 4, 1944 |
| 2,613,352 | Kellogg | Oct. 7, 1952 |
| 2,845,623 | Iddings | July 29, 1958 |
| 2,887,927 | Newton | May 26, 1959 |
| 2,896,145 | Snodgrass | July 21, 1959 |
| 2,949,808 | Thurow | Aug. 23, 1960 |
| 3,005,185 | Cumming et al. | Oct. 17, 1961 |